United States Patent

[11] 3,570,640

| [72] | Inventor | Roger G. Martz<br>Lebanon, Ind. |
|---|---|---|
| [21] | Appl. No. | 760,607 |
| [22] | Filed | Sept. 18, 1968 |
| [45] | Patented | Mar. 16, 1971 |
| [73] | Assignee | Stewart-Warner Corporation<br>Chicago, Ill. |

[54] CLUTCH BEARING ASSEMBLY
4 Claims, 4 Drawing Figs.

[52] U.S. Cl............................................................ 192/84,
308/191, 29/149.5
[51] Int. Cl............................................................F16d 27/07,
F16c 33/64
[50] Field of Search............................................192/84 (A),
84 (A1), 84 (A2), 84 (C); 188/163; 29/149.5;
308/189, 191

[56] References Cited
UNITED STATES PATENTS

| 630,101 | 8/1899 | Parkin............................ | 308/189 |
| 2,919,776 | 1/1960 | Pierce............................ | 192/84(C) |
| 2,919,777 | 1/1960 | Walter............................ | 192/84(C) |
| 3,428,378 | 2/1969 | Divine et al.................. | 29/149.5(X) |
| 3,455,421 | 7/1969 | Miller............................ | 192/84(C) |

*Primary Examiner*—Allan D. Herrmann
*Attorneys*—Augustus G. Douvas, William J. Newman and Norton Lesser ABSTRACT: An electromagnetic clutch employing a unitary inner ball bearing race member and shaft coupler and a concentric, unitary, outer ball bearing race member and driving friction plate support and electron beam welded to the friction plate which eliminates the need for separate snaprings, bearing sleeve and armature hub while reducing overall size without compromising load capacity.

PATENTED MAR 16 1971

INVENTOR
ROGER G. MARTZ

BY *A. G. Douvas*

ATTORNEY

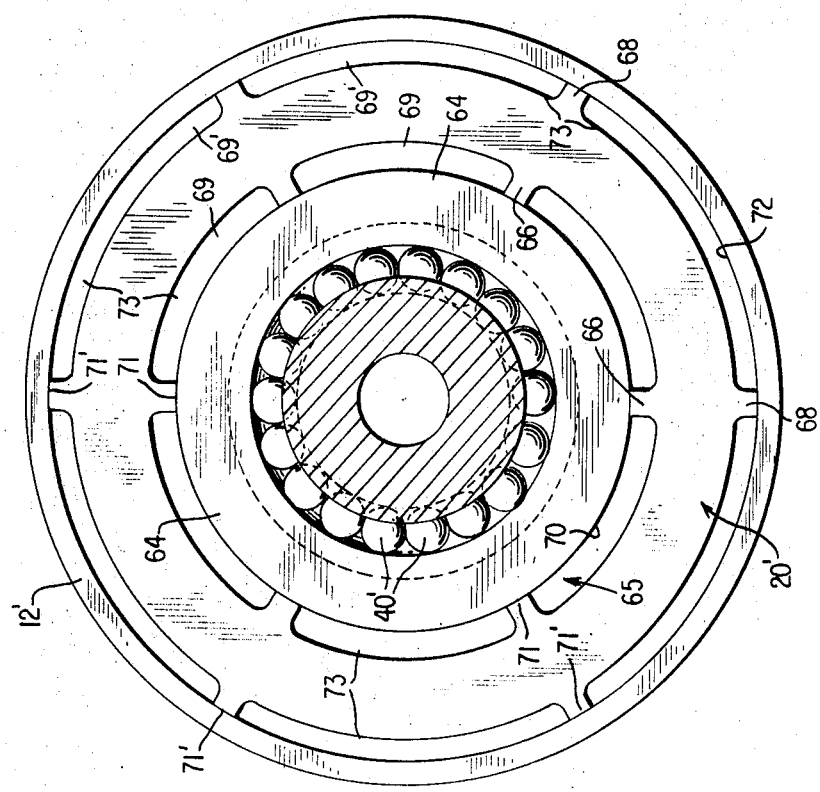
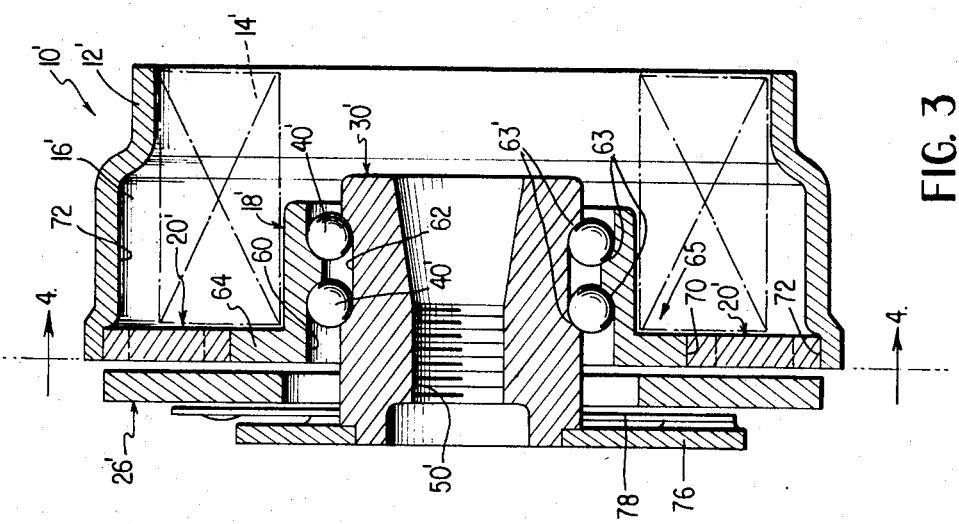
FIG. 4
FIG. 3
INVENTOR
ROGER G. MARTZ
BY  *A. G. Douvas*
ATTORNEY

CLUTCH BEARING ASSEMBLY

BACKGROUND OF THE INVENTION

1. Field of the Invention

This invention relates to electromagnetic clutches and brakes, and more particularly to such devices which employ antifriction bearings for supporting a driven friction member in juxtaposition to a driving friction member for selective frictional coupling therebetween.

2. Description of the Prior Art

Prior art electromagnetic clutches and/or brakes, in general, employ an annular casing which carries an annular electromagnetic coil, electrically energized to produce a magnetic field and frictionally couple a driven friction member to a driving friction plate through an axially shiftable armature. Normally, the driving plate is positioned adjacent the electromagnetic coil. The assembly includes, in internal, concentric fashion, an armature hub which supports the driven friction disc or armature in axially spaced position, with the faces of the driven friction disc opposed and parallel to the outer face of the driving friction plate. In the absence of coil energization, antifriction means such as a ball bearing assembly, positioned between the driving friction plate and the armature hub, allows relative movement therebetween.

Conventionally, even in the most simplified construction, the ball bearing assembly consists of individual outer and inner and outer bearing race members carrying either roller or ball bearing sandwiched therebetween. The individual antifriction bearing members are manufactured at high cost due to high precision necessary and are separately carried by the armature hub and the outer bearing sleeve, respectively. Conventionally, snaprings and the like are employed for maintaining the individual bearing race members within formed peripheral recesses on the outer surface of the armature hub and the inner surface of the bearing sleeve. Further, the driving friction plate which is in itself is annular in form is mechanically coupled to both the outer protective housing and to the outer surface of the bearing sleeve. In order to establish the necessary magnetic circuit, it is required to perforate the driving friction plate. Conventionally, a series of adjacent narrow, circumferential slots are provided which are narrow in relation to plate thickness. The small cross section of the portion separating the slots from the bearing sleeve presents problems in tool maintenance and also in the control of concentricity in the finished product. The driving friction plate, has in the past, been formed by stamping metal plate material. Further, where the clutch or brake assembly involves the separate elements of the armature hub, the individual inner and outer bearing race members, the bearing sleeve and the driving friction plate, final finishing to the desired size is achieved only after assembly or partial assembly, greatly increasing the cost of the final product.

Referring to FIGS. 1 and 2 of the drawings, a typical prior art electromagnetic clutch 10 of this type is shown as incorporating a modified cylindrical casing or housing 12 which carries an electromagnetic clutch-actuating or solenoid coil 14, shown in dotted line form, which fills the annular gap 16 existing between casing 12 and bearing sleeve 18. An annular driving friction plate 20 is fixed to the bearing sleeve and casing 12 at one end of the assembly with the inner end 22 of the annular driving plate being received within a formed recess 24 at the end of bearing sleeve 18.

In conventional fashion, a driven friction member in the form of an apertured disc 26 is supported for selective relative movement about the assembly axis on an antifriction bearing assembly 28, positioned between the armature hub 30 and the bearing sleeve 18 or frictional coupling to the face of driving plate 20. In this respect, the inner periphery of bearing sleeve 18 is provided with an internal flange 32 at one end which acts to locate a separate outer bearing race member 34. In like fashion, the outer periphery of the armature hub 30 is provided with radial flange portion 36 which axially locates a second, inner bearing race member 38. The opposing peripheral surfaces of the bearing race members 34 and 38 are appropriately configured to support and maintain antifriction members, in this case metal balls 40. Individual snaprings 42 and 44 are carried by slots 46 and 48 within armature hub 30 and the bearing sleeve 18, respectively, for locking the bearing race members in position within the assembly. Further, as is conventional, armature hub carries a threaded internal bore 50 which is normally coupled to the output shaft (not shown) of the clutch.

By referring to FIG. 2, it is noted that the annular driving friction plate 20 is configured to include a series of perforations to establish magnetic circuit control for the flux produced by energization of coil 14. Curved slots 52 are narrow in relation to plate thickness and are separated by thin connecting portions 54 in a circumferential array, thus providing a thin annular section 56 which is of small cross section adjacent bearing sleeve 18. The thin plate cross section at 54 and 56 present problems in tool maintenance and also in control of concentricity of the central portion of the driving friction plate. Maintenance of concentricity is further hampered by subsequent assembly normally by brazing the inner periphery of the friction plate 20 to the outer periphery of bearing sleeve 18. In a typical construction, the housing or casing 12, and the driving friction plate 20 are formed of metal stampings which are copper brazed together and machined subsequent to assembly.

SUMMARY OF THE INVENTION

This invention is directed to an improved simplified electromagnetic clutch or brake assembly wherein the need for individual bearing members, separately coupled to the bearing sleeve and the internal armature hub by snaprings or the like has been eliminated. Electron beam welding of cast, integrally formed dual function elements to form the clutch assembly results in an overall reduction in cost and simplification of the final product.

The electromagnetic clutch includes a driving friction member operatively positioned relative to an electromagnetic coil and a driven friction member in juxtaposition therewith. The improvement, in one form, is directed to an antifriction bearing for supporting the driven and driving friction members for selective relative movement or frictional coupling therebetween and involves the use of a unitary inner antifriction bearing race member and shaft coupler and a concentric, unitary outer antifriction bearing race member and driving friction plate support. Conventional antifriction bearing elements such as ball bearings or roller bearings are carried therebetween in conventional bearing fashion.

Preferably, the unitary inner race member and shaft coupler and the unitary outer race member and friction plate support are in the form of concentric cast cylinders. The outer race member and driving friction plate support includes a radial flange portion at one end which is butt welded by an electron beam welding apparatus to a driving friction member in the form of an annular plate whose friction surface is in a plane at right angles to the axis of the assembly. The driven friction member comprises a second annular member whose friction surface is coplanar to the driving friction plate and is spaced slightly therefrom. Further, the annular driving friction plate is preferably cast, and includes spaced, inwardly extending, radial projections to facilitate butt welding directly to the outer surface of the unitary outer race member and the driving friction plate support member to facilitate magnetic flux control.

BRIEF DESCRIPTION OF THE DRAWING

FIG. 3 is a sectional view of the improved, electromagnetic clutch actuated friction of the present invention.

FIG. 4 is a front, sectional view of the clutch of FIG. 3 taken about lines 4—4.

DESCRIPTION OF THE PREFERRED EMBODIMENT

Figure 2:
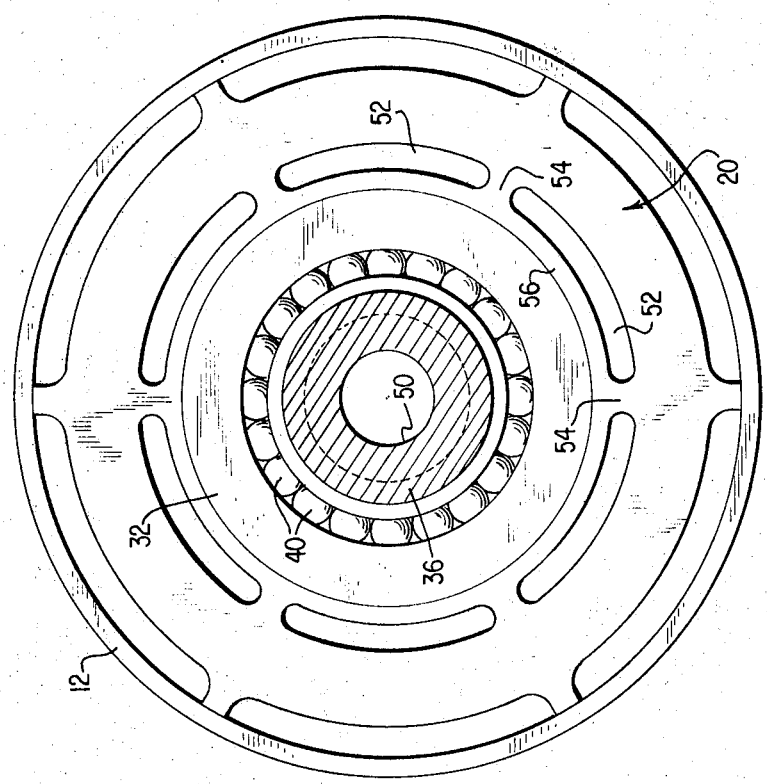
FIG. 2 is a front, sectional view of the clutch of FIG. 1 taken about lines 2—2.

The improved, simplified magnetic clutch of the present invention, is shown in FIGS. 3 and 4. The contrast between the structure of the present invention and that of the prior art is readily apparent. Although the invention has been applied to an electromagnetic clutch 10', the same principles apply to electromagnetic brakes. Further, while the invention is illustrated in connection with antifriction bearings, it is equally applicable to a device which employs sleeve bearings, etc. The clutch 10' employs an outer cylindrical casing or housing 12' which may be identical to that of the prior art device. Further, a driven aperture disc or armature 26' is identical in configuration and function to that of the previously described clutch 10.

Note however, that the present design eliminates the necessity of using individual and separate bearing sleeve, armature hub, and snaprings for maintaining individual bearing race members positioned on these members. In the present invention, there is provided at 30', a unitary antifriction bearing inner race member and shaft coupler and concentric thereto, a unitary outer antifriction bearing race member and driving friction plate support 18' which are cast from suitable metal into the desired final configuration. The unitary outer race member and friction plate support 18' has an inner peripheral surface 60 which is configured identically to the inner surface of the individual bearing race member 38 of the prior art device. Further, the outer peripheral surface of the unitary inner race member and shaft coupler 30' is provided with an annular groove 62 for receiving axially spaced series of bearing members in the form of metal balls 40'. The balls are held from axial movement by appropriate surfaces 63 formed on the outer race member and integral friction plate support 18' and surfaces 63' on the inner race member 30'. It is further noted that one end of the unitary outer race member and concentric driving friction plate support 18' carries an outwardly directed integral ring or flange portion 64 to form the integral driving friction plate support 65 which is in edge abutting contact with the inner periphery of a specially formed cast metal ring or annular driving friction plate 20'. The cast driving friction plate 20', unlike the prior art device, is provided with radially aligned, inner and outer projections or struts 66, and 68, respectively at spaced circumferential positions to define recesses 69 and 69', which projections are butt welded at welds 71, preferably by an electron beam welding process to the outer peripheral edge 70 of the flange 64 and at welds 71' to the inner periphery 72 of casing 12' to form a plurality of passageways 73 for magnetic flux.

A flange 76 at the extending end of the shaft coupler 30' has fixed thereto a plurality of leaf springs such as 78. The springs 78 are also conventionally fixed to the driven plate or armature 26' to support the armature on the shaft coupler 30' and for axially retracting or disengaging the armature from plate 20' when the coil is deenergized.

Figure 1:
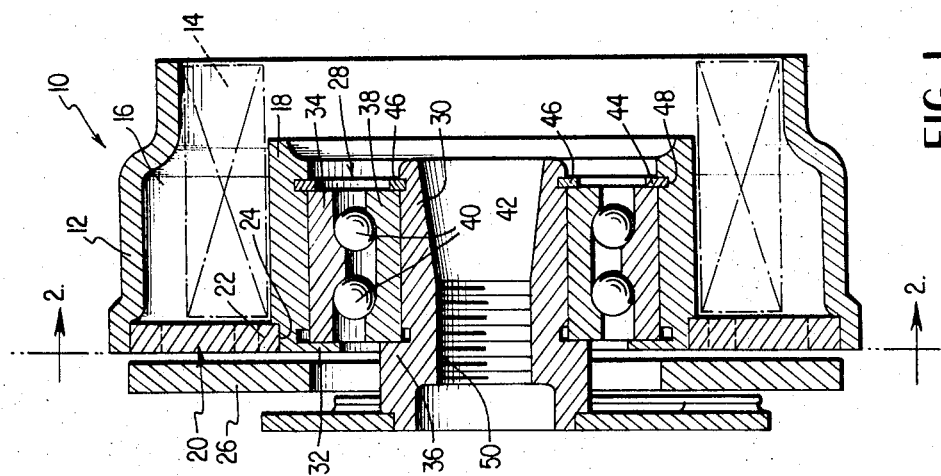
FIG. 1 is a sectional view of a typical prior art electromagnetic actuated friction clutch.

The operation and further construction of the clutch 10' is essentially identical to that of the prior art construction shown in FIGS. 1 and 2 with the exception that the annular space 16' which exists between casing 12' and the outer periphery of the unitary race member and friction plate support 18' is much larger than that of the prior art design, allowing an electromagnetic actuator coil 14' of larger size and electrical capacity to be carried thereby. This provides in conjunction with the beam welding of the various components the preferred assembly. Further, the arrangement of the present invention allows the ready substitution of cast material which is much more economically shaped since the elements as cast incorporate slots, air gaps, etc. The prior clutches involves metal stampings which must be formed prior to copper brazing together and machined into final form subsequent to assembly. It is noted, for instance, that the peripheral surfaces 60 and 62 of the ball bearing portion of the assembly may be readily heat treated and hardened subsequent to casting without materially affecting the configuration as originally cast. Since the present design provides more room for the magnet coil assembly, the torque rating of the clutch may be readily increased by employing the same overall coil dimension for instance 10.9 cubic inches, a reduction in size of the overall assembly may be achieved. In the present design, using the struts or projections 66, the driving plate may be mounted directly onto the bearing race which allows for more durable tooling and therefore lower price cost. All parts are fully finished machine prior to assembly and this reduces costs by eliminating handling, etc. The operation of the clutch 10' is essentially identical to that of clutch 10, and again, the interior threaded bore 50' of the inner unitary inner race member and shaft coupling may be threadably engaged with an output shaft for the clutch (not shown).

With the exception of the electromagnetic actuator or drive coil 14' all of the parts of the electromagnetic clutch design 10' of the present invention may be formed by casting the same from a suitable metal, with certain of the elements being cast of magnetic material.

While the invention has been particularly shown and described with reference to a preferred embodiment, it will be understood by those skilled in the art that the foregoing and other changes in form and detail may be made therein without departing from the spirit and scope of the invention.

I claim:

1. In a simplified electromagnetic clutch including a driving friction member, a driven member for coupling to a shaft, an armature carried by said driven member for frictional contact with said driving friction member to move said driven member, an electromagnetic coil operatively positioned relative to said armature for attracting said armature into frictional contact with said driving friction member, and bearing means supporting said driving and driven members for relative movement therebetween in the absence of coil energization, the improvement wherein; said bearing means includes an inner bearing member and an outer bearing member concentric with said inner bearing member and having an integral driving friction plate support butt welded to said driving friction member.

2. The electromagnetic clutch claimed in claim 1 in which said driving plate support comprises a radial flange on said outer bearing member, and said driving friction member comprises a ring having a plurality of radially inwardly directed struts thereon electron beam butt welded to the periphery of said flange with the spaces between said struts defining a plurality of circumferentially spaced passageways for magnetic flux between said coil and said armature.

3. The electromagnetic clutch claimed in claim 2 in which said inner bearing member comprises a cast metal with a hardened bearing surface integrally formed on said driven member, said outer bearing member comprises a cast metal with a hardened bearing surface formed thereon in opposed position to said inner bearing member surface, said bearing means comprises a plurality of balls engaging said opposed bearing surfaces, and said inner and outer bearing means have respective integrally formed cooperating surfaces thereon for preventing axial movement of said balls.

4. A method of fabricating a driving friction member for an electromagnetic clutch of the type including a driven member for coupling to a shaft, an armature carried by said driven member for frictional contact with said driving friction member to move said driven member, an electromagnetic coil operatively positioned relative to said armature, and concentric inner and outer bearing means for supporting said driven and driving members respectively for relative movement therebetween in the absence of coil energization, the improvement comprising the steps of providing a ring on said outer bearing member extending radially outwardly of said bearing member, providing an annular drive plate having a plurality of circumferentially spaced recesses formed along the inner edge periphery of said annular drive plate to define struts between said recesses, and butt welding said struts to the outer periphery of said ring whereby said recesses form magnetic flux passageways of relatively narrow width as compared to the thickness of said drive plate for attracting said armature.